United States Patent [19]

Shigenaga

[11] Patent Number: 4,852,156
[45] Date of Patent: Jul. 25, 1989

[54] PRIVATE TELEPHONE SYSTEM USING A PERSONAL CODE NUMBER TO ACCESS THE TELEPHONE NEAREST TO THE CODE NUMBER HOLDER

[75] Inventor: Yoshimi Shigenaga, Tokyo, Japan
[73] Assignee: Casio Computer Co., Ltd., Tokyo, Japan
[21] Appl. No.: 107,383
[22] Filed: Oct. 9, 1987

[30] Foreign Application Priority Data
Oct. 13, 1986 [JP] Japan .................... 61-156358[U]

[51] Int. Cl.$^4$ ............................................. H04M 1/72
[52] U.S. Cl. ............................... 379/172; 379/173; 379/216
[58] Field of Search ............... 379/144, 171, 172, 173, 379/216

[56] References Cited

U.S. PATENT DOCUMENTS

| | | | |
|---|---|---|---|
| 3,920,926 | 11/1975 | Lenaerts et al. | 179/90 B |
| 3,932,709 | 1/1976 | Hoff et al. | 179/90 K |
| 4,313,035 | 1/1982 | Jordan et al. | 179/18 BE |
| 4,680,785 | 7/1987 | Akiyama et al. | 379/216 |

FOREIGN PATENT DOCUMENTS 3047883 7/1982 Fed. Rep. of Germany .

OTHER PUBLICATIONS

Telcom Report (Siemens) vol. 9, No. 4, Jul./Aug. 1986; pp. 270–273.
HICOM-Chipkarte, p. 270, left-hand col., line 1–right-hand col., line 10; p. 272, right-hand col., line 1—p. 273 left-hand col., line 21.
Patent Abstracts of Japan, vol. 10, No. 275.

Primary Examiner—Stafford D. Schreyer
Attorney, Agent, or Firm—Frishauf, Holtz, Goodman & Woodward

[57] ABSTRACT

A telephone system, wherein an IC card device storing a personal ID number is inserted into the telephone nearest the owner of the IC card device, thus registering the personal ID number in association with the nearest telephone. Once the personal ID number has been registered in this manner, this telephone is automatically connected to any calling telephone on which the personal ID number is dialed.

7 Claims, 6 Drawing Sheets

PRIVATE TELEPHONE SYSTEM USING A PERSONAL CODE NUMBER TO ACCESS THE TELEPHONE NEAREST TO THE CODE NUMBER HOLDER

BACKGROUND OF THE INVENTION

The present invention relates to a telephone system which can connect one telephone to another in accordance with a personal ID number assigned to an individual.

In a private telephone system installed in a company or the like, a caller dials a desired telephone number to talk with a person. When this person is absent, another person responds and tells the caller where the called person is. The caller may then ask this person to give a message to the called person, or may dial the number of the telephone nearest the called person. It takes some time to convey the message, or the dial the number of the other telephone. Consequently, the work efficiency in the office is reduced.

The same problem is also inherent in the public telephone system. A supervisor, who wants to contact a salesman visiting customers, must dial the telephone numbers of these customers until he get in touch with the salesman. In the worst case, he cannot contact the salesman in time, which may result in a great business damage.

SUMMARY OF THE INVENTION

The object of the present invention is to provide a telephone system which can connect a telephone to another in accordance with the personal ID number assigned to a person, thereby enabling a caller to quickly get in touch and talk with the person identified by the personal ID number, and which can therefore serve to increase the work efficiency in offices.

According to the present invention, there is provided a telephone system comprising a plurality of telephones each assigned with a telephone number and provided with input means for inputting a personal ID number of a person who wants to use the telephone; and exchange means including a reference table means for storing data representing the telephone numbers and the personal ID numbers, and means for connecting any calling telephone to a called telephone in accordance with the data stored in the reference table means.

DETAILED DESCRIPTION OF THE PREFERRED EMBODIMENT

Figure 1:
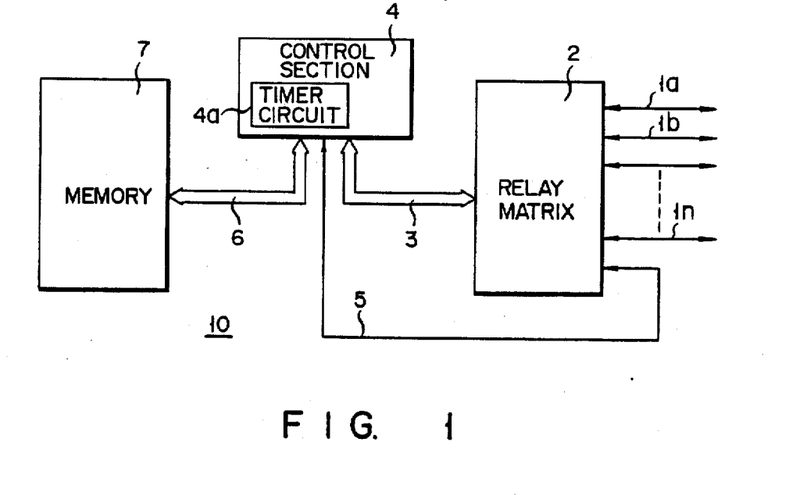
FIG. 1 is a block diagram showing the electric circuit of the exchange apparatus used in a first embodiment of the present invention.

FIG. 1 shows exchange apparatus 10 used in a first embodiment of this invention, which is used as a private telephone system. Exchange apparatus 10 can operate in two modes, i.e., exchange mode (ordinary mode) and ID number-registering mode (special mode). As is shown in FIG. 1, exchange apparatus 10 comprises telephone lines 1a, 1b, ... 1n, relay matrix 2 connected to lines 1a, 1b, ... 1n, control bus 3, control section 4 coupled to relay matrix 2 by control bus 3, dial signal line 5 connecting relay matrix 2 and control section 4, data bus 6, and memory 7 coupled to section 4 by data bus 6.

When exchange apparatus 10 is set in the exchange mode, a personal ID number assigned to an individual can be supplied in the form of dial signals to relay matrix 2 through one of telephone lines 1a, 1b, ... 1n. When exchange apparatus 10 is set in the ID number-registering mode, an ID number-registering signal and a personal ID number can be supplied in the form of dial signals to relay matrix 2 through one of telephone lines 1a, 1b, ... 1n. control section 4 through control bus 3.

When apparatus 10 is set in the ID number-registering mode, the dial signals are supplied from relay matrix 2 to control section 4 through dial signal line 5.

Upon receipt of the dial signals forming the personal ID number supplied via control bus 3, control section 4, whose main component is a general purpose CPU, encodes these signals, thus forming an ID code. The ID code is supplied to memory 7 via data bus 6. Memory 7 is thereby accessed, and the data required for selecting the telephone corresponding to the ID code (i.e., the personal ID number) is read out from memory 7. This data is supplied to control section 4 through data bus 6. Control section 4 calculates procedures of connecting telephone to one of telephone lines 1a, 1b, ... 1n, in accordance with the data read out from memory 7. At the same time, control section 4 gives relay matrix 2 instructions for connecting the telephone to one of telephone lines 1a, 1b, ... 1n.

On the other hand, upon receipt of the ID number-registering signal and the personal ID number, control section 4 updates the data which is stored in memory 7 and corresponds to this personal ID number.

Figure 3:
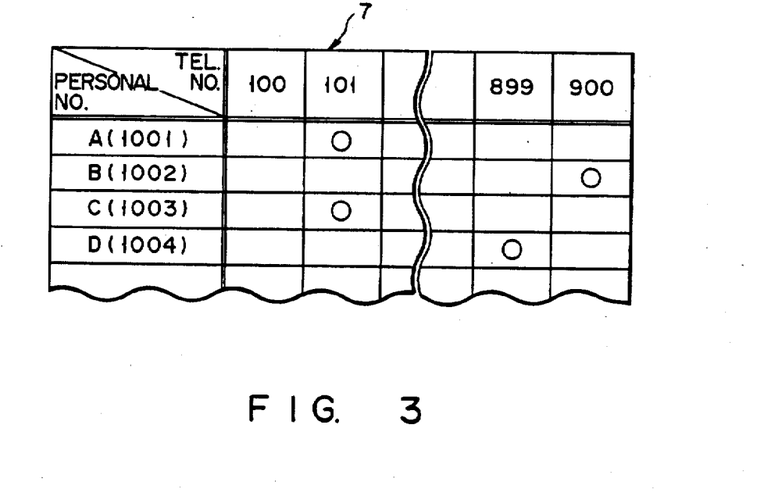
FIGS. 3 and 4 are tables showing the data stored in the memory used in the first embodiment of this invention.
Figure 4:
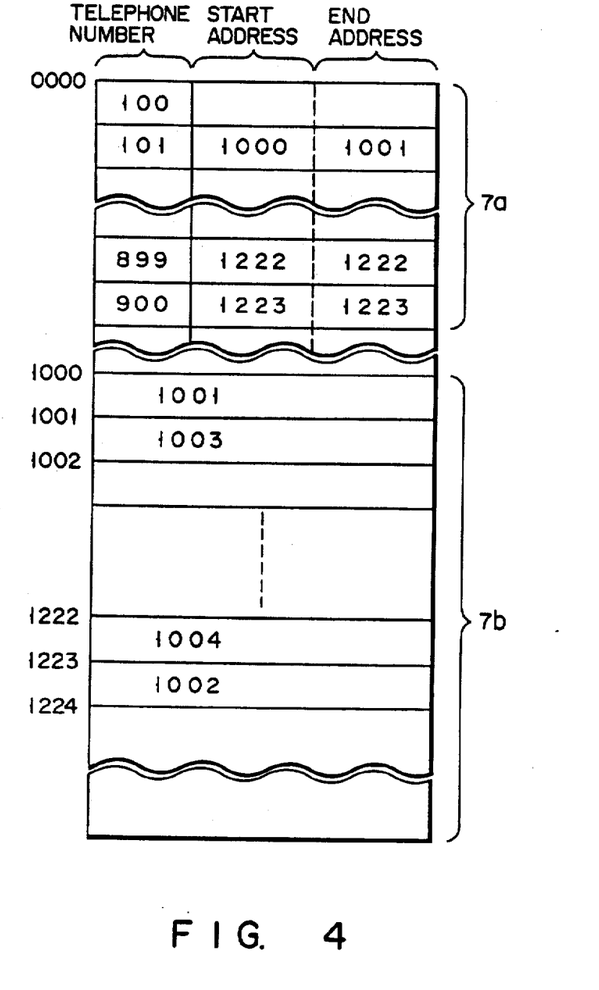

Memory 7 stores a table of personal ID numbers and telephone numbers, which are in such a relationship as is schematically shown in FIG. 3 and which are stored in such a way as is illustrated in FIG. 4. The data of this table stored in memory 7 can be altered in accordance with the ID number-registering signal and the personal ID number supplied to memory 7 when exchange apparatus is set in the ID number-registering mode.

Telephones 20 are connected to telephone lines 1a, 1b, ... 1n of exchange apparatus 10. Each of these telephones 20 has the structure shown in FIG. 2. As is shown in this figure, each telephone 20 comprises telephone unit 11, first changeover relay 12, control section 13, second changeover relay 14, automatic dialing unit 15, IC card reader 16, and modem 17. Telephone unit 11 is connected to telephone line 1 by first changeover relay 12, and is provided with display section 11a. Control section 13 is provided to control the other components of telephone 20, and stores a program for controlling the other components. Its main component is a general purpose CPU. More specifically, control section 13 gives changeover control signals to first and second changeover relays 12 and 14, and supplies control signals to automatic dialing unit 15, IC card reader 16, and modem 17. Second changeover relay 14 connects automatic dialing unit 15 or modem 17 to first changeover unit 12 in accordance with the control signal given by control section 13.

Figure 2:
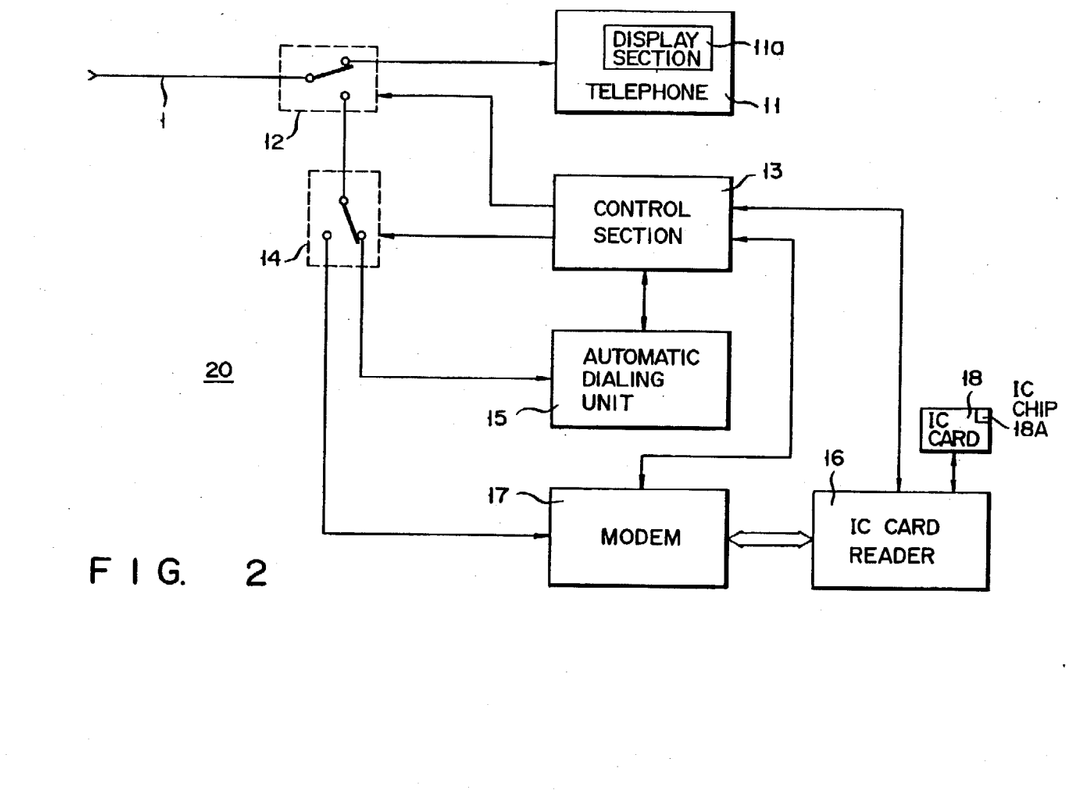
FIG. 2 is a block diagram illustrating the electric circuit of one of the telephones used in the first embodiment of the present invention.

Automatic dialing unit 15 is designed to the ID number-registering signal and the number of telephone 20 to exchange apparatus 10 through second changeover relay 14, first changeover relay 12 and telephone line 1. As has been described, the ID number-registering signal supplied from unit 15 sets exchange apparatus 10 into the ID number-registering mode.

When IC card device 18 is inserted into IC card reader 16, IC card reader 16 reads the personal ID number stored in a semiconductor IC chip 18A contained in the IC card device 18. IC card device 18 is a plastic card containing a semiconductor IC chip storing the personal ID number data and having connecting terminals on its surface. The IC chip stores the personal ID number. Modem 17 is provided for supplying the data read by IC card reader, to exchange apparatus 10 through second changeover relay 14, first changeover relay 12 and telephone line 1.

Figure 5:
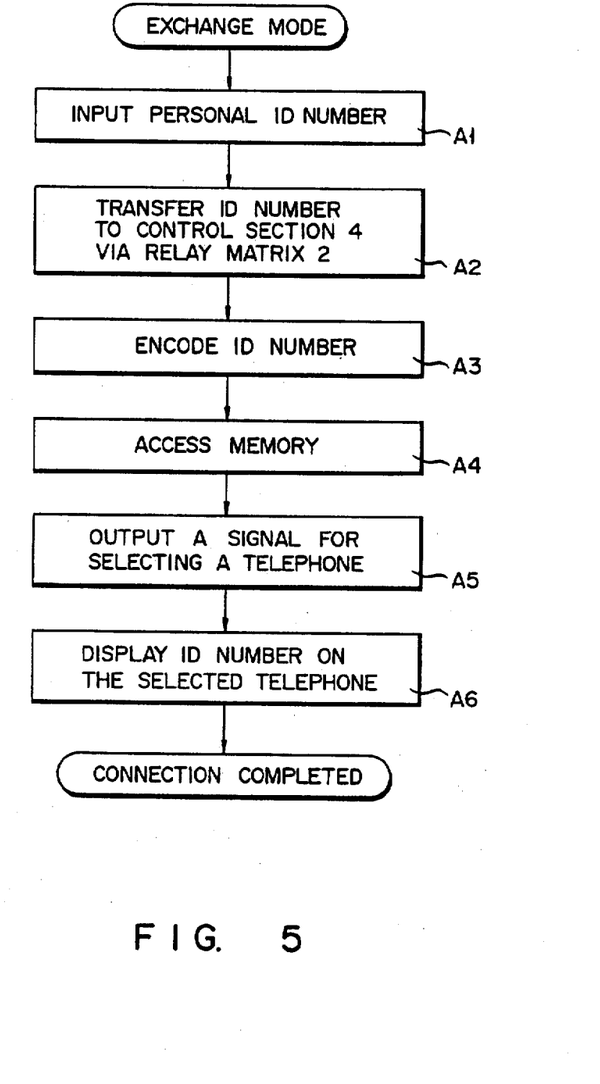
FIG. 5 is a flow chart explaining how the first embodiment operates in exchange mode.
Figure 6:
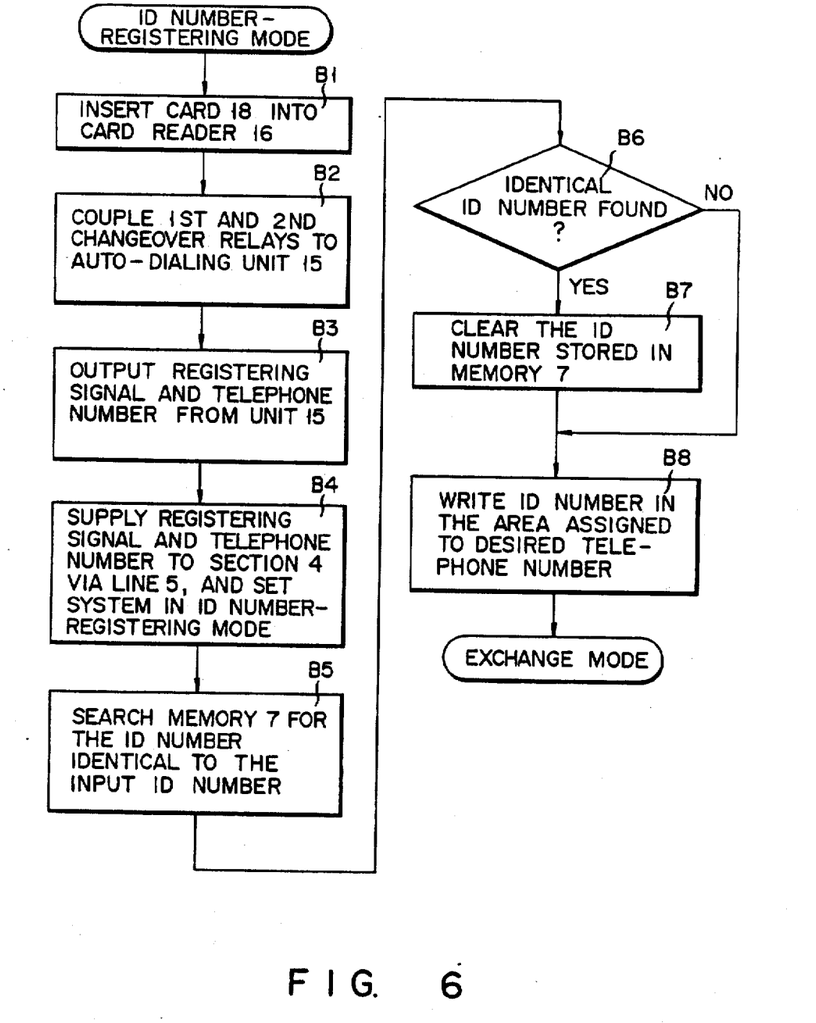
FIG. 6 is a flow chart showing how the first embodiment operates in ID number-registering mode.

The operation of the telephone system described above will now be explained with reference to FIGS. 5 and 6.

In this telephone system, exchange apparatus 10 is usually set in the ordinary operation mode, i.e., the exchange mode. Assume that memory 7 of exchange apparatus 10 stores personal ID numbers and telephone numbers in such a relationship as is schematically shown in the tables of FIGS. 3 and 4. That is, personal ID number "1001" corresponds to telephone number "101"; personal ID number "1002" corresponds to telephone number "90038; personal ID number "1003" corresponds to telephone number "101"; and personal ID number "1004" corresponds to telephone number "899".

When the receiver of calling telephone 20 is taken up, control section 13 causes first changeover relay 12 to connect telephone unit 11 to telephone line 1. When the user dials the personal ID number of the person whom the user wants to talk to, the dial signals representing the personal ID number are supplied to exchange apparatus 10 through telephone line 1, (Steps A1 and A2 in the flow chart of FIG. 5).

In exchange apparatus 10, the dial signal (i.e., the personal ID number) are supplied to control section 4 via control bus 3. Control section 4 encodes the dial signals into an ID code (Step A3). This ID code is supplied to memory 7 via data bus 6, thereby accessing memory 7 (Step A4). As a result, a signal required for selecting the telephone whose number corresponds to the personal ID number (Step A5). If the personal ID number, which the user (or caller) has dialed, is "1001", the corresponding telephone number, "101", is read out from memory 7. This telephone number is supplied to control section 4 through data bus 6. Control section 4 executes the procedure for connecting telephone line 1 to the called telephone whose number is "101". This telephone-connecting procedure is supplied from control section 4 to relay matrix 2 via control bus 2. In accordance with the procedure, relay matrix 2 establishes connection between the calling telephone and the called telephone. Then, the personal ID number, "1001", is displayed by display section 11a of the called telephone 20 (Step A6). Anyone, who sees this number "1001" being displayed, can understand who is being called.

As has been explained, when exchange apparatus 10 is set in the exchange mode, it suffices to dial a personal ID number on the nearest telephone 20, in order to have this telephone connected to the telephone 20 of the person assigned with the personal ID number. In the above example, personal ID number "1001" is dialed, and the telephone is automatically connected to the telephone whose number is "101". Similarly, when personal ID number "1002" is dialed, telephone 20 of number "900" will be automatically connected. When personal ID number "1003" is dialed, telephone 20 of number "101" will be connected. When personal ID number "1004" is dialed, telephone 20 of number "899" will be connected.

It will now be explained how the telephone system operates when exchange apparatus 10 is in the ID number-registering mode, with reference to the flow chart of FIG. 6. Exchange apparatus 10 can be set into the ID number-registering mode by anyone who is away from his or her desk and wishes to receive telephone calls in the room or place where he or she is at present.

First, IC card device 18 is inserted into IC card reader of the nearest telephone 20 (Step B1). Control section 13 causes first changeover relay 12 to connect itself to second changeover relay 14, and causes second changeover relay 14 to connect itself to automatic dialing unit 15 (Step B2). As a result, automatic dialing unit 15 is connected to telephone line 1. Unit 15 has received the personal ID number read from IC card device 18 by IC card reader 16. Therefore, automatic dialing unit 15 outputs the personal ID number and the number of telephone 20 (Step B3). The data output from unit 15 is supplied to exchange apparatus 10 through telephone line 1. In apparatus 10, an ID number-registering signal is supplied to control section 4 via dial signal line 5, whereby control section 4 is set into the ID number-registering mode (Step B4).

In telephone 20, control section 13 causes second changeover relay 14 to connect first changeover relay 12 or modem 17, after the ID number-registering signal has been supplied to control section 4 of exchange apparatus 10. Then, control section 13 gives IC card reader 16 a control signal, whereby IC card reader 16 reads the personal ID number from IC card device 18. The personal ID number, thus read from IC card device 18, is supplied to exchange apparatus 10 through modem 17 and telephone line 1, and is finally input to control section 4 via dial signal line 5.

Control section 4 searches memory 7 for a personal ID number identical to the personal ID number read out from IC card device 18 (Step B5). When the identical personal ID number has been written into memory 7, this ID number is erased (Step B7). When no identical personal ID numbers are stored in memory 7, the personal ID number read from IC card device 18 is written into the memory area assigned to the telephone number already supplied from automatic dialing unit 15 (Step B8). In other words, the telephone number associated to the personal ID number of the owner of IC card device 18 is changed to the number of the nearest telephone 20. In short, the personal ID number is registered via the nearest telephone 20 in the memory 7 of exchanged apparatus 10.

In telephone 20, control section 13 put the other components of telephone 20 into idling condition, after al data has been transferred to exchange apparatus 10.

Thereafter, first changeover relay 12 is operated under the control of section 13, thereby connecting telephone unit 11 to telephone line 1. Then, control section 13 goes into idling condition, too. Control section 13 remains in this condition until it receives the next operation command.

Now that the personal ID number is registered via telephone 20 in memory 7, this telephone can be connected to any other telephone on which the personal ID number has been dialed. For instance, if a person whose personal ID number is "1234" registers this personal ID number in the telephone the number of which is "001", anyone else can get in touch with this person by dialing number "1234". When this person moves to a place, he or she can register his or her personal ID number in the telephone set in that place by inserting the IC card device 18 into the IC card reader provided in this telephone. If the personal ID number is registered via the telephone, this telephone can be connected to any other telephone on which the personal ID number has been dialed. For example, even if a person, whose ID number is "123", moves to a meeting room where a telephone is set, this telephone whose number is, for example, "002" will be automatically connected to any other telephone on which personal ID number "1234" has been dialed.

With the telephone system described above, it is possible for a person to register his or her ID number by inserting IC card 18 into IC card reader 16 of the nearest telephone whenever he or she moves from one place to another. He or she can readily and quickly be talked to through the telephone. Therefore, the telephone system can help to increase the work efficiency.

Once a personal ID number has been registered in a certain telephone, it is remains registered therein until it is registered via another telephone into memory 7. Thus, even after a person, who has registered his or her ID number via the telephone set in a meeting room, returns to his or her room, any telephone call for him or her is automatically transferred to the telephone set in the meeting room, if this person forgets to register the ID number via the telephone set in his or her room.

Figure 7:
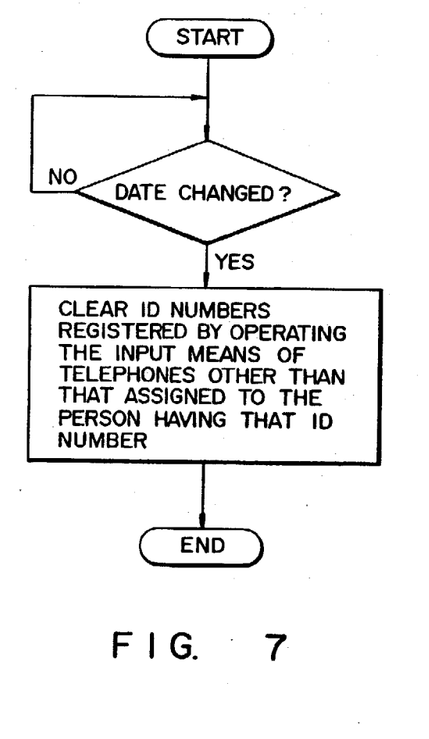
FIG. 7 is a flow chart illustrating how a second embodiment of this invention operates.
Figure 8:
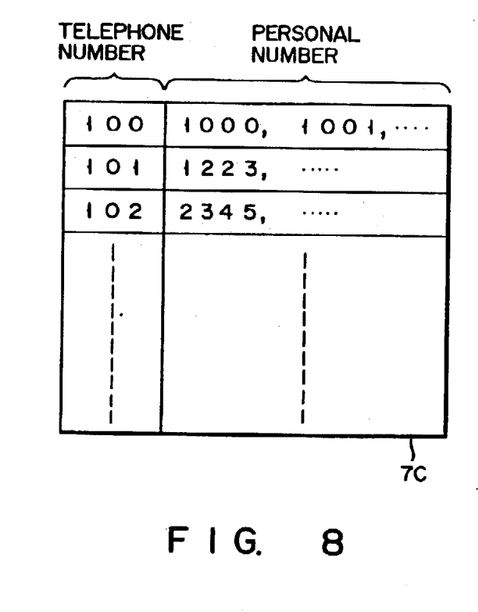
FIG. 8 is a table showing the data stored in the memory provided within the exchange apparatus used in the second embodiment of the present invention.

In a telephone system according to a second embodiment of the present invention, this problem can be solved. In this embodiment, additional memory area 7C is provided in memory 7 of exchange apparatus 10, and timer clock circuit 4a is provided in control section 4. A person registers his or her ID number into memory 7 via the telephone set in his or her room. The ID number is stored in memory area 7C. When this person moves to another room and registers the ID number via the telephone set in this room, this ID number is stored in a memory area other than area 7C. Hence, the personal ID number remains unerased in memory area 7C, and the person need not register the personal ID number again via the telephone set in his or her room, upon returning to his or her room. The personal ID number stored in the memory area other than area 7C is automatically erased when timer circuit 4a detects that it is twelve midnight, and a new day starts. Thereafter, any telephone calling this person is connected to the telephone set in his ore her room to the telephone set in the other room.

In both the first embodiment and the second embodiment, when a telephone number is dialed on any telephone, this telephone will be connected to the telephone of the dialed number, just as in the conventional telephone system, no matter whether or not a personal ID number has been registered in association with the number of the called telephone.

The present invention is not limited to the embodiments described above. Various changes and modifications can be made without departing the spirit and scope of th invention. For example, two or more personal ID numbers can be registered in association of one telephone number, so that many people can receive calls through the same telephone set in, for instance, a meeting room. Further, exchange apparatus 10 can be of a dial-in-type, and telephones 20 can be replaced by those having a push-button key pad. Still further, the ID card can be replaced by a magnetic card or a laser card. (A laser card is a plastic card containing an optically recording medium.) Moreover, control section 4 of exchange apparatus 10 may be designed to distinguish telephone numbers from personal ID numbers, so that a calling telephone can be connected to the telephone whose number has been dialed on the calling telephone. Furthermore, a plurality of memory areas may be provided in memory 7 for the same personal ID number, so that a calling telephone can be connected to the telephones through which the ID number has been registered, one after another. In this case, each telephone must be provided with means for generating a signal representing the called person is absent.

As has been described, the telephone system according to the present invention can connect a telephone to another in accordance with the personal ID number assigned to a person, thus enabling a caller to quickly get in touch with the person identified by the ID number. The telephone system can therefore serve to increase the work efficiency in offices.

What is claimed is:

1. A telephone system comprising:
a plurality of telephones each assigned with a telephone number and each having input means for inputting a personal ID number of a person who wants to use the telephone;
exchange means coupled to said plurality of telephones, said exchange means including:
reference table means for storing data which relates the telephone number with the personal ID number;
mode selecting means for selecting one of an exchange mode and a registration mode;
connecting means for connecting a calling telephone to a called telephone in accordance with data stored in said reference table means based on the personal ID number input from the calling telephone, when said mode selecting means selects the exchange mode;
writing means for writing change data related to the telephone number and the personal ID number into said reference table means, based on the personal ID number and the telephone number input from said input means provided in said telephone, when said mode selecting means selects the registration mode;
time detecting means for counting time and for detecting whether or not a counting time reaches a predetermined time; and
erasing means for erasing the changing data written into said reference table means by said changing means.

2. The telephone system of claim 1, wherein said reference table means includes:

first memory means for storing fixed data which relates the telephone number with the personal ID number; and second memory means for storing changing data written by said changing means; and wherein said changing means includes means for writing the changing data in said second memory means; and said erasing means includes means for erasing the changing data stored in said second memory means.

3. The telephone system of claim 1, wherein said input means includes:

memory card means which is detachably connectable with said telephone, and including means for storing said personal ID number; and memory card reading means for receiving said memory card means which is insertable therein, for reading said personal ID number stored in said memory card means.

4. The telephone system of claim 3, wherein said telephone includes:

judging means for judging whether or not said memory card means is inserted into said memory card reading means;

mode designating means for designating the registration mode for said mode selecting means, when said judging means judges that said memory card means is inserted into said memory card reading means, whereby said mode selecting means selects the registration mode; and telephone number generating means for generating the telephone number assigned to said telephone and for outputting the telephone number to said changing means; and wherein said writing means includes means for writing the changed data in said reference table means in accordance with the telephone number output from said telephone number generating means and said personal ID number read out from said memory card means.

5. A telephone system comprising:

a plurality of telephones each assigned with a telephone number and each having input means for inputting a personal ID number of a person who wants to use the telephone; and exchange means coupled to said plurality of telephones, said exchange means including reference table means for storing data representing the telephone numbers of said telephones and the personal ID numbers of persons who want to use the telephones; and connecting means for connecting any calling telephone to a called telephone in accordance with the data stored in said reference table means;

said reference table means including:

first memory means for storing the numbers of said telephones and the personal ID numbers associated with said telephone numbers, respectively; and second memory means for storing personal ID numbers in association with telephone numbers; and said exchange means further including date-change detecting means for detecting changes of dates; and control means for clearing the date stored in said first memory means when said date-change detecting means detects a change of date.

6. The telephone system of claim 5, wherein said input means includes:

memory card means which is detachably connectable with said telephone, and including means for storing said personal ID number; and memory card reading means for receiving said memory card means which is insertable therein, for reading said personal ID number stored in said memory card means.

7. The telephone system according to claim 5, wherein said input means includes means for reading a personal ID number from a first memory means storing the personal ID number.

* * * * *

UNITED STATES PATENT AND TRADEMARK OFFICE
CERTIFICATE OF CORRECTION

PATENT NO.   : 4,852,156
DATED        : July 25, 1989
INVENTOR(S)  : Yoshimi SHIGENAGA It is certified that error appears in the above-identified patent and that said Letters Patent is hereby corrected as shown below:

In the title page, under "OTHER PUBLICATIONS", after "No.275" (last line), insert --(Japanese Application No.61-95693)--.

Signed and Sealed this

Twenty-eighth Day of August, 1990

Attest:

HARRY F. MANBECK, JR.

*Attesting Officer*      *Commissioner of Patents and Trademarks*